US011563791B2

(12) United States Patent
Walters et al.

(10) Patent No.: US 11,563,791 B2
(45) Date of Patent: *Jan. 24, 2023

(54) AUTOMATED CACHING AND TABLING LAYER FOR FINDING AND SWAPPING MEDIA CONTENT

(71) Applicant: Capital One Services, LLC, McLean, VA (US)

(72) Inventors: Austin Walters, Savoy, IL (US); Jeremy Goodsitt, Champaign, IL (US); Vincent Pham, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/671,748

(22) Filed: Feb. 15, 2022

(65) Prior Publication Data

US 2022/0182434 A1    Jun. 9, 2022

Related U.S. Application Data

(63) Continuation of application No. 17/112,427, filed on Dec. 4, 2020, now Pat. No. 11,290,508.

(51) Int. Cl.
*H04L 65/75* (2022.01)
*H04N 21/2343* (2011.01)
(Continued)

(52) U.S. Cl.
CPC ........... *H04L 65/762* (2022.05); *G06N 20/00* (2019.01); *H04L 43/106* (2013.01);
(Continued)

(58) Field of Classification Search
CPC ... H04L 65/762; H04L 67/568; H04L 43/106; H04L 45/7453; G06N 20/00; H04N 21/2343
(Continued)

(56) References Cited

U.S. PATENT DOCUMENTS 7,720,924 B2    5/2010   Swinton
7,949,775 B2    5/2011   Virdi et al.
(Continued)

OTHER PUBLICATIONS

U.S. Appl. No. 17/112,427, "An Automated Caching and Tabling Layer for Finding and Swapping Media Content," to Austin Walters, filed Dec. 4, 2020.

*Primary Examiner* — Hermon Asres
(74) *Attorney, Agent, or Firm* — Sterne, Kessler, Goldstein & Fox P.L.L.C.

(57) ABSTRACT

A system and method for automated caching and tabling for finding and swapping media content is disclosed. The system and method include at least: (a) detecting, by one or more computing devices, one or more media packets transmitted over a network, wherein the one or more media packets are associated with the media content; (b) generating, by the one or more computing devices, a profile for the media content based on characteristics of the one or more media packets; (c) generating, by the one or more computing devices, a hash value based on the profile; (d) transmitting for storage in a database, by the one or more computing devices, the hash value, the profile, and the one or more media packets; (e) detecting, by the one or more computing devices, one or more subsequent media packets sent over the network and addressed to a destination to determine that the one or more subsequent media packets are associated with the media content by comparing the one or more subsequent media packets to the profile via the hash value; and (f) based on the detecting in (e) the system and method can further include transmitting, by the one or more computing devices, the one or more subsequent media packets or the one or more media packets to the destination based on a predetermined criteria.

20 Claims, 5 Drawing Sheets

(51) Int. Cl.
  *G06N 20/00* (2019.01)
  *H04L 45/7453* (2022.01)
  *H04L 43/106* (2022.01)
  *H04L 67/568* (2022.01)
(52) U.S. Cl.
  CPC ........ *H04L 45/7453* (2013.01); *H04L 67/568* (2022.05); *H04N 21/2343* (2013.01)
(58) Field of Classification Search
  USPC .......................................................... 709/231
  See application file for complete search history.

(56) References Cited

U.S. PATENT DOCUMENTS

| | | |
|---|---|---|
| 8,489,760 B2 | 7/2013 | Visharam et al. |
| 9,386,064 B2 | 7/2016 | Luby et al. |
| 2010/0205162 A1* | 8/2010 | Davis ...................... G06F 16/40 |
| | | 718/1 |
| 2014/0019635 A1 | 1/2014 | Reznik et al. |
| 2015/0100582 A1* | 4/2015 | Xi ........................ G06F 16/7867 |
| | | 707/738 |
| 2017/0195450 A1* | 7/2017 | Su ...................... H04N 21/4331 |

* cited by examiner

AUTOMATED CACHING AND TABLING LAYER FOR FINDING AND SWAPPING MEDIA CONTENT

CROSS-REFERENCE TO RELATED APPLICATIONS

This application is a continuation of U.S. patent application Ser. No. 17/112,427, filed Dec. 4, 2020, which is incorporated by reference herein in its entirety.

TECHNICAL FIELD

Embodiments relate to systems and methods for caching data, specifically for detecting and swapping media content.

BACKGROUND

Corporations receive, store, and transmit data over their intranets on a daily basis. The data may include data associated with media content including video files, audio files, images, or documents. The media content may be shared between users or devices over a corporate intranet. For example, users or devices may receive media content via data packets over the Internet and they may further forward or share the media content with other users or devices within the company via the intranet. Throughout this receiving, storing, and transmitting, the backend systems of corporations may capture and store the data. The purposes of capturing the data vary and can include capturing for analysis or reuse, particularly if the media content is popular such that it is shared frequently amongst users or devices. A benefit of this capturing for analysis and reuse is that it can lead to decreased network traffic because the users or devices within the corporation can quickly retrieve and transmit data associated with the media content without adding any additional traffic associated with obtaining the media content from external sources, such as the Internet, each time the media content is shared. However, an issue remains as to whether the data being received, stored, or shared is the most up to date with regard to its quality and/or content. This is a problem when users and devices are sharing data that is out of date or is inferior in quality to data available for the same media content. Thus, a need remains for a system and method for automated caching and tabling of the data associated with media content and for swapping the data.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the pertinent art to make and use the disclosure.

DETAILED DESCRIPTION

Figure 1:
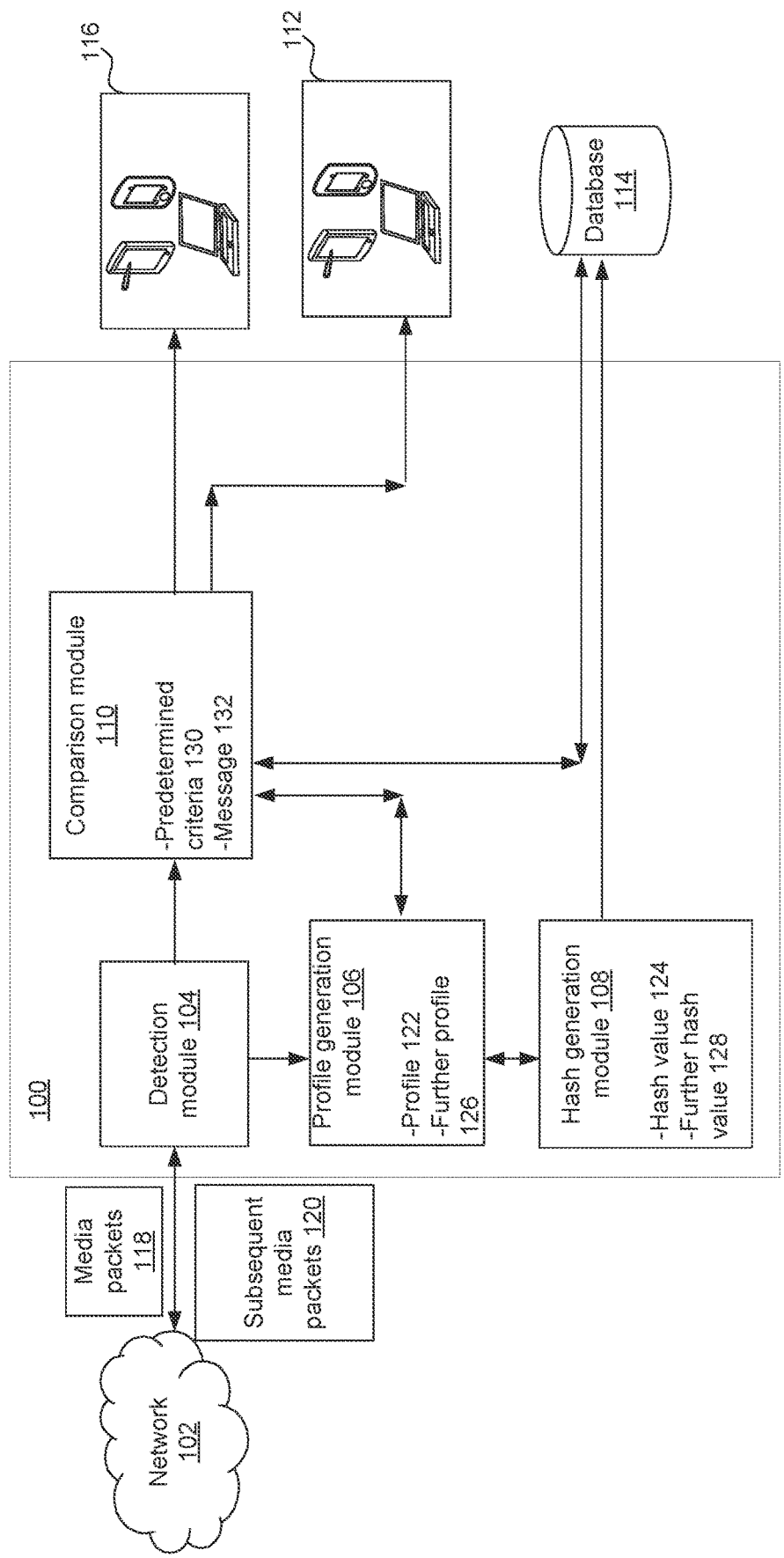
FIG. 1 is a system for caching and swapping media content in an embodiment of the present disclosure.

Embodiments disclosed herein provide a system and method for automated caching and tabling for detecting and swapping media content. The system and method include at least: (a) detecting, by one or more computing devices, one or more media packets transmitted over a network, wherein the one or more media packets are associated with the media content. The system and method further include (b) generating, by the one or more computing devices, a profile for the media content based on characteristics of the one or more media packets and (c) generating, by the one or more computing devices, a hash value based on the profile. The system and method can further include (d) transmitting for storage in a database, by the one or more computing devices, the hash value, the profile, and the one or more media packets and (e) detecting, by the one or more computing devices, one or more subsequent media packets sent over the network and addressed to a destination to determine that the one or more subsequent media packets are associated with the media content by comparing the one or more subsequent media packets to the profile via the hash value. Based on the detecting in (e) the system and method can further include (f) transmitting, by the one or more computing devices, the one or more subsequent media packets or the one or more media packets to the destination based on a predetermined criteria.

The following embodiments are described in sufficient detail to enable those skilled in the art to make and use the disclosure. It is to be understood that other embodiments are evident based on the present disclosure, and that system, process, or mechanical changes may be made without departing from the scope of an embodiment of the present disclosure.

In the following description, numerous specific details are given to provide a thorough understanding of the disclosure. However, it will be apparent that the disclosure may be practiced without these specific details. In order to avoid obscuring an embodiment of the present disclosure, some well-known circuits, system configurations, architectures, and process steps are not disclosed in detail.

The drawings showing embodiments of the system are semi-diagrammatic, and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the disclosure may be operated in any orientation.

The term "module" or "unit" referred to herein may include software, hardware, or a combination thereof in an embodiment of the present disclosure in accordance with the context in which the term is used. For example, the software may be machine code, firmware, embedded code, or application software. Also for example, the hardware may be circuitry, a processor, a special purpose computer, an integrated circuit, integrated circuit cores, a pressure sensor, an inertial sensor, a microelectromechanical system (MEMS), passive devices, or a combination thereof. Further, if a module or unit is written in the system or apparatus claims section below, the module or unit is deemed to include hardware circuitry for the purposes and the scope of the system or apparatus claims.

The modules or units in the following description of the embodiments may be coupled to one another as described or as shown. The coupling may be direct or indirect, without or with intervening items between coupled modules or units. The coupling may be by physical contact or by communication between modules or units.

System Overview and Function

FIG. 1 shows a system 100 for caching and swapping media content in an embodiment of the present disclosure. In one embodiment, the system 100 may be part of a backend computing infrastructure, including a server infrastructure of a company or institution. In one embodiment, the system 100 may be implemented with modules and sub-modules. For example, the system 100 may include a detection module 104, a profile generation module 106, a hash generation module 108, and a comparison module 110. In one embodiment, the detection module 104 may be coupled to the comparison module 110 and the profile generation module 106. The profile generation module 106 may further be coupled to the hash generation module 108 and the comparison module 110.

The detection module 104 enables the detection of one or more media packets 118 or one or more subsequent media packets 120, sent to or from devices via a network 102. The media packets 118 and the subsequent media packets 120 refer to packets of data associated with a media content, such as a video file, an audio file, an image, or a document. The media packets 118 and the subsequent media packets 120 can include control information and data, and may be implemented using known packet architectures for protocols such as TCP/IP, UDP, or similar protocols, the details of which will not be discussed herein. The devices may include a mobile device, a laptop computer, a desktop computer, grid-computing resources, a virtualized computing resource, cloud computing resources, routers, switches, peer-to-peer distributed computing devices, a server, or a server farm.

The network 102 refers to any public or private computer network, such as the Internet, or a corporate intranet. While shown as a single unit in FIG. 1, the network 102 can span and represent a variety of networks and network topologies. For example, the network 102 can include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in the network 102. Cable, Ethernet, digital subscriber line (DSL), fiber optic lines, fiber to the home (FTTH), and plain old telephone service (POTS) are examples of wired communication that may be included in the network 102. Further, the network 102 can traverse a number of topologies and distances. For example, the network 102 can include direct connection, personal area network (PAN), local area network (LAN), metropolitan area network (MAN), wide area network (WAN), or a combination thereof.

Continuing with the example, in one embodiment, the detection module 104 enables the detection of the media packets 118 or the subsequent media packets 120 from the network 102 using a variety of methods. For example, in one embodiment, the detection module 104 may be implemented as a packet analyzer (alternatively known as a packet sniffer) . The packet analyzer refers to a computer program or piece of hardware, such as a packet capture appliance, that can intercept and log traffic that passes through the network 102. The packet analyzer may log and analyze the traffic by analyzing various headers, fields, or identifiers in packets, for example the media packets 118 or the subsequent media packets 120, to determine characteristics of the packets. The characteristics may be, for example, the type of media associated with the packets, the size of the packets (in bits or bytes), an address where the packets originated from, a destination address to where the packets are being sent, or the quality of the media content associated with the packets as measuring the fidelity of the data, resolution of the data, frame rate, frame size, etc. The aforementioned are merely exemplary and not meant to be limiting.

In one embodiment, the detection module 104 may further enable crawling functions over the network 102 to further detect the packets. The crawling functions may be performed by automatically and continuously searching for, and indexing the media packets 118 or the subsequent media packets 120, based on the same analysis mentioned above, by analyzing the characteristics of the packets based on their headers, fields, or identifiers. In one embodiment, the crawling functions may also be performed by detecting hypertext links sent to and from devices on the network 102 and following, from web page to web page on the network 102, or following hypertext links to storage locations or repositories where the media content, and as a result the media packets 118 or the subsequent media packets 120, is stored. The crawling functions can further include extracting or copying the media packets 118 or the subsequent media packets 120 and returning them to the system 100 for storage and further processing. The further processing can include generating a profile 122 or a further profile 126 for the media content based on the media packets 118 or the subsequent media packets 120, and generating a hash value 124 or a further hash value 128 associated with the profile 122 and the further profile 126, and storing (i.e., caching) the same for reuse and retrieval when the media content is to be transmitted between devices on the network 102. Details of generating the profile 122, the further profile 126, the hash value 124, and the further hash value 128 will be discussed further below.

The functions of the detection module 104 may be performed either as a real-time process or as part of a batch process. Real-time refers to an instance where the detecting of the media packets 118 or the subsequent media packets 120 is done near instantly from when the media packets 118 or the subsequent media packets 120 are sent from one device through the network 102 to another device. As a result, the detection may be near instantaneous and while the media packets 118 or the subsequent media packets 120 are being transmitted throughout the network 102.

Alternatively, the functions of the detection module 104 may be performed as part of a batch process. The batch process refers to an instance where the detection is performed by the system 100 after the media packets 118 or the subsequent media packets 120 are transmitted through the network 102. For example, in one embodiment, the network 102 can track the data that is sent over the network 102 in a log file, along with hyperlinks or addresses to the data, and save the log file to a repository or storage location. At a predetermined time after the data has been sent, the detection module 104 may parse the log file and follow the hyperlinks to the media packets 118 or the subsequent media packets 120 to further analyze their characteristics.

Continuing with the example, in one embodiment, once the detection module 104 performs its functions and detects the media packets 118 or the subsequent media packets 120, the detection module 104 can pass control, and the media packets 118, the subsequent media packets 120, or a combination thereof to the profile generation module 106 and/or the comparison module 110. Which module the media packets 118 or the subsequent media packets 120 are transmitted to depends on the configuration of the system 100. For the purposes of discussion herein, and for simplification, it is assumed that the functions of detecting the media packets 118 are separate from the functions of detecting the subsequent media packets 120, such that the media packets 118 are first detected and, at a subsequent time, the detection of the subsequent media packets 120 occurs. This is merely exemplary and in other embodiments the detection of the media packets 118 and the subsequent media packets 120 may be done simultaneously.

In the embodiment where the detection of the media packets 118 is performed prior to the detection of the subsequent media packets 120, the detection module 104 can pass control and the media packets 118 to the profile generation module 106. The profile generation module 106 enables the generation of the profile 122 based on the media packets 118. The profile 122 refers to a data structure containing the characteristics of the media content associated with the media packets 118, and which can provide an overall representation of the media content. For example, if the media packets 118 are associated with an image, the profile 122 may be a table or vector, with entries indicating the characteristics of the image, for example, image size, compression, saturation, bit rate, etc., as examples. The characteristics may be obtained from analyzing the headers, fields, or identifiers of the media packets 118 as described above with respect to the detection module 104. The characteristics may also be obtained from the detection module 104, for example as variables or parameters when control is passed from the detection module 104 to the profile generation module 106. In one embodiment, the profile generation module 106 can analyze the headers, fields, or identifiers of the media packets 118 and based on the same determine the characteristics of the media content.

The profile 122 is generated for purposes of summarizing or describing the media content, and may be used by the system 100 to compare the profile 122 to subsequent media packets 120 via a further profile 126 associated with the subsequent media packets 120. In this way, it may be determined whether the subsequent media packets 120 are similar to and relate to the same media content associated with the profile 122. As a result of this comparison, the system 100 can further determine which media packets to transmit to a destination 116. The details of the comparison process and transmission will be discussed further below.

In one embodiment, once the profile generation module 106 generates the profile 122, the profile generation module 106 can optionally add tags or labels to the profile 122 based on further analyzing the media content via the received media packets 118. The tags or labels refer to indicators that further characterize the media content. For example, if the media content is an image, the tags or labels may be indicators indicating the people or objects in the image. If the media content is a document, the tags or labels may be indicators indicating what topics are addressed in the document. If the media content is an audio file, the tags or labels can indicate an individual or entity that is speaking or making sounds in an audio file. The tags or labels may be implemented as data structures, variables, or parameters. In one embodiment, the profile generation module 106 can add the tags or labels to the profile 122 to add further detail to the profile 122.

In one embodiment, the tags or labels may be generated based on performing a machine learning process on the media content via analyzing the media packets 118 once enough media packets 118 are received, such that the media content as a whole may be analyzed. In one embodiment, the machine learning process may be implemented using a neural network, a convolutional neural network, recurrent neural networks, non-recurrent neural networks, or other machine learning processes. The machine learning process may be trained to recognize aspects of the media content. For example, in the case where the media content is an image, the machine learning process may be trained to recognize objects and/or individuals in the image by, for example, extracting one or more features, such as curves, peaks, valleys, shapes, lines, or colors, or a combination thereof such that people or objects may be recognized. In the case where the media content is a document, the machine learning process may be trained to recognize characters and/or the context of the document by analyzing the characters, words, or format of the document, or the context of words in the document using natural language processing techniques and transformer based language models, for example the Bidirectional Encoder Representations from Transformers (BERT) language model developed or the Robustly-Optimized Bidirectional Encoder Representations from Transformers approach (RoBERTa) language model, as examples. In the case where the media content is an audio file, the machine learning process may be trained to recognize sounds or voices to identify individuals or entities speaking or making sounds on the audio file. The aforementioned are merely examples and not meant to be limiting.

Based on performing the machine learning process, the tags or labels may be generated as the output of the machine learning process. In one embodiment, the tags or labels can further be used to classify the profile 122. For example, the classification can indicate the media content belongs to a certain category of media, for example business document, personal images, news article, etc. as examples. Any number of classifications may be used, and the classifications may be customized by an administrator of the system 100, or as part of the configuration of the machine learning process.

Continuing with the example, once the profile generation module 106 generates the profile 122, the profile generation module 106 can pass control, the profile 122, and the media packets 118 to the hash generation module 108. The hash generation module 108 enables the generation of a hash value 124 based on the profile 122. The hash value 124 refers to a numeric value of a fixed length that uniquely identifies data. The purpose of generating the hash value 124 is to generate a mapping to the profile 122 such that when the profile 122 is stored on a database 114, it may be searched for and retrieved based on the hash value 124. Hash values and how they are generated are known in the art and will not be described further herein. For the purposes of discussion in this disclosure, it is presumed that the hash value 124 is generated for the profile 122.

In one embodiment, once the hash generation module 108 generates the hash value 124, the hash generation module 108 can pass control, the profile 122, the hash value 124, and the media packets 118 to a database 114 for storage and for later search and retrieval by the system 100.

Continuing with the example, in one embodiment, once the profile 122, the hash value 124, and the media packets 118 are stored in the database 114, the system 100 can continue to operate to detect the subsequent media packets 120 in the same manner as was described with respect to the detection module 104. In one embodiment, once the detection module 104 detects the subsequent media packets 120, the detection module 104 may pass control and the subsequent media packets 120 to the comparison module 110.

The comparison module 110 enables a comparison process wherein the subsequent media packets 120 are compared to one or more profiles stored on the database 114. Based on the comparison, the comparison module 110 can determine whether to transmit the subsequent media packets 120 or the media packets 118 to the destination 116. The determination may be based on a predetermined criteria 130, as will be explained further below.

In one embodiment, the comparison module 110 can perform its functions by first receiving the subsequent media packets 120 and forwarding the subsequent media packets 120 to the profile generation module 106. The purpose of this forwarding is to generate a further profile 126 associated with the subsequent media packets 120 such that the subsequent media packets 120 may be compared to the profiles stored in the database 114. Thereafter, a determination may be made as to whether the further profile 126 matches any pre-existing profile 122 such that the media packets 118 associated with the profile 122 may be sent to the destination 116 to facilitate faster transmission of the data, and to reduce traffic on the network 102. The further profile 126 may be generated in the same manner that the profile 122 is generated and using the techniques previously described with respect to the profile generation module 106.

In one embodiment, once the further profile 126 is generated, the comparison module 110 determines whether the further profile 126 is similar to any of the profiles stored on the database 114. In one embodiment, the comparison process can proceed by having a further hash value 128 generated for the further profile 126 using the hash generation module 108. Based on the further hash value 128, a search may be performed on the database 114 for profiles matching the further profile 126 or being highly similar to the further profile 126. The matching may be done, for example, by matching the further hash value 128 to the hash values stored on the database 114. In one embodiment, if the further hash value 128 maps or is equal to a particular profile 122 via the hash value 124, the comparison module 110 can determine that the further profile 126 is the same as the profile 122 and relates to the same media content.

In the case that there is no direct match found, the comparison module 110 can make a determination as to how similar the further profile 126 is to other profiles in the database 114 to determine if the further profile 126 is highly similar to any profile 122 on the database 114. Highly similar refers to the further profile 126 being within a threshold value of similarity to one of the profiles stored on the database 114 such that they can be considered the same. In one embodiment, the threshold value may be a percentage representing the similarity. For example, if the further profile 126 is at least 99% similar with respect to its characteristics to a profile 122 on the database 114, the further profile 126 may be said to be "highly similar" and represent the same media content. The aforementioned is merely an example of the threshold value and not meant to be limiting. Other threshold values may be used and may be customized by an administrator of the system 100.

How the comparison module 110 determines whether the further profile 126 is highly similar to a profile 122 on the database 114 may be performed in a variety of ways. For example, in one embodiment, the comparison module 110 can compare the characteristics of the further profile 126 to the characteristics of other profiles in the database 114 to determine how many of those characteristics are the same between those two profiles. If, for example, based on the comparison, the comparison module 110 determines that the characteristics between the two profiles are within the threshold value of similarity, the comparison module 110 can determine that the further profile 126 is highly similar to that profile 122. For example, if after comparing the characteristics of the further profile 126, such as file size, file type, or tags or labels, to the characteristics of a profile 122 on the database 114, the comparison module 110 and determines that 99% of the characteristics between the two profiles are same, the comparison module 110 can determine that the two profiles are highly similar.

In one embodiment, the comparison module 110 can further use a clustering algorithm to determine whether the further profile 126 is highly similar to a profile 122 on the database 114. Clustering algorithms refer to computer implemented procedures that enable grouping of a set of data. Examples, of clustering algorithms include K-Means Clustering, Mean-Shift Clustering, Density-Based Spatial Clustering of Applications with Noise, Expectation-Maximization Clustering using Gaussian Mixture Models, Agglomerative Hierarchical Clustering, or other techniques used to group data. When using a clustering algorithm to determine whether the further profile 126 is highly similar to a profile 122, it is assumed that the profiles stored on the database 114 have been previously been grouped using a clustering algorithm. How the grouping is done can be customized by a developer or administrator of the system 100. For the purposes of this disclosure, an important aspect is that the profiles are grouped and represented as a data point in an N-dimensional space, such that each profile 122 represents a data point in the N-dimensional space. In one embodiment, in order to determine whether the further profile 126 is highly similar to a profile 122, the comparison module 110 can put the further profile 126 through the same clustering algorithm that was used to group the profiles on the database 114, for example a K-Means Clustering algorithm. As a result, the further profile 126 will also be represented as a data point in the N-dimensional space. To determine whether the further profile 126 is highly similar to a profile 122, the comparison module 110 can then determine a Euclidian distance between the point representing the further profile 126 and points representing the profiles on the database 114, and determine which profiles the further profile 126 is closest to. If, for example, the distance is determined to be within a threshold value, the comparison module 110 can determine that the two points represent the same media content, and can determine that the further profile 126 is highly similar to a profile 122 represented by the data point which is closest to the data point representing the further profile 126.

Continuing with the example, in one embodiment, if a match is not found for the further profile 126 or if the further profile 126 is determined not to be highly similar to a profile 122 stored on the database 114, the comparison module 110 can determine that the media content has not previously been seen by the system 100, and can save the further profile 126, the further hash value 128, and the subsequent media packets 120 in the database 114 as a new entry, similar to how the profile 122, the hash value 124, and the media packets 118 were stored, for future analysis and reuse if the media content associated with the further profile 126 is seen again via future subsequent media packets 120. The comparison module 110 can also further transmit the subsequent media packets 120 to their destination 116.

In one embodiment, if the further profile 126 is matched to a profile 122 or is determined to be highly similar to a profile 122, such that the comparison module 110 determines that the further profile 126 relates to the same media content as the profile 122, the comparison module 110 can further determine whether to send the media packets 118 or the subsequent media packets 120 to the destination 116 based on a predetermined criteria 130. The predetermined criteria 130 refers to a condition that must be met before the subsequent media packets 120 are sent to the destination 116. The predetermined criteria 130 may be implemented as a rule or a set of rules. For example, the predetermined criteria 130 may be business rules implemented as part of a business rule management system (BRMS), conditional statements (e.g., if-else statements) implemented with software or hardware components, or threshold conditions implemented with software or hardware components. The predetermined criteria 130 can depend on a number of factors including at least a quality of the subsequent media packets 120 as compared to the media packets 118, a bandwidth availability of the network 102, a timestamp associated with the creation of the media content associated with the subsequent media packets 120, a privacy policy associated with the subsequent media packets 120, or a combination thereof, as examples. The aforementioned are merely exemplary and not meant to be limiting. Other factors can affect which packets are transmitted.

By way of example, if the predetermined criteria 130 is implemented as one or more conditional statements, the predetermined criteria 130 may have conditions such as: (1) if the quality of the subsequent media packets 120 is greater than the quality of the media packets 118, then transmit the subsequent media packets 120; (2) if the quality of the subsequent media packets 120 is greater than the quality of the media packets 118, but the bandwidth of the network 102 is below a certain threshold such that traffic is deemed to be heavy on the network 102, then transmit the media packets 118; (3) if the quality of the subsequent media packets 120 is equal to the quality of the media packets 118, then send the media packets 118; (4) if the subsequent media packets 120 are being sent to individuals that do not have permission to view the subsequent media packets 120, then send the media packets 118; (5) if the timestamp of creation of the media content associated with the subsequent media packets 120 is later in time than the timestamp of creation associated with the media packets 118, then send the subsequent media packets 120. The aforementioned is merely exemplary and not meant to be limiting. The examples are meant to show how the predetermined criteria 130 may be implemented and the type of rules or conditional statements that may be put in place. Other rules or conditional statements may be customized by an administrator of the system 100.

In the aforementioned examples, quality refers to a degree to which the subsequent media packets 120 is an improvement over the media packets 118. The quality may be an improvement in a variety of ways depending on the media content. For example, if the media content is an image, the quality can refer to the resolution associated with the subsequent media packets 120 and the media packets 118. If the resolution of the media content associated with the subsequent media packets 120 is better than the resolution associated with the media packets 118, such that if the subsequent media packets 120 are sent to the destination 116 a clearer image will be presented, the subsequent media packets 120 are said to have greater quality than the media packets 118. In another example, if the media content is a document, the quality can refer to a version of the document, such that newer versions of the document may be said to have greater quality. If the media content is an audio file, the quality can refer to the fidelity of the audio file as represented by the audio file type, the sample rate, etc., such that audio files with higher fidelity may be said to have greater quality. Additionally, system conditions may determine whether the subsequent media packets 120 are an improvement over media packet 118. For example, network bandwidth, system processing capabilities and storage capacity may be factors that are considered when determining whether the subsequent media packets 120 are an improvement over media packet 118. In an embodiment, although the substance of subsequent media packets 120 represents an improvement over media packets 118 (e.g., better resolution, sound quality, etc.), the system may determine that media packets 118 should be transmitted instead of the subsequent media packets 120 due to system conditions.

Once a determination is made as to which packets are to be transmitted to the destination 116, the comparison module 110 can transmit the packets to the destination 116. In one embodiment, once the packets are transmitted to the destination 116, the comparison module 110 can further optionally generate a message 132 to an originator 112 of the media content. The message 132 may be in the form of a report, a notification, an alert, or a combination thereof to the originator 112. The originator 112 refers to the user or entity that either created the media content or first introduced the media content into the system 100. For example, if the media content is a document, and the document is shared amongst users, once the document is shared and a determination is made by the comparison module 110 as to what version of the document to send, the comparison module 110 can further notify the person or entity that first generated the document which it can deem the originator 112, by for example, analyzing the data associated with the document to find a creator of the document. If a person or entity may be identified, the comparison module 110 can generate and transmit the message 132 to the person or entity to notify that person or entity that the document has been shared over the network 102.

In one embodiment, the comparison module 110 can further enable the updating of the media content based on the quality of the subsequent media packets 120 as compared to the media packets 118. For example, as previously indicated, the comparison module 110 can determine whether the quality of the subsequent media packets 120 is greater than the quality of the media packets 118. In one embodiment, if the comparison module 110 determines that the quality of the subsequent media packets 120 is greater than the media packets 118, the comparison module 110 can update the profile 112 to be the further profile 126 and replace the profile 122 on the database 114 with the further profile 126. The purpose of this updating is to have the highest quality or best version of the media content on the system 100 for reuse. Moreover, the comparison module 110 can also update the hash value 124 to be the further hash value 128. In one embodiment, the further profile 126, the further hash value 128, and the subsequent media packets 120 may be transmitted to the database to update and replace the hash value 124, the profile 122, and the media packets 118.

Figure 2:
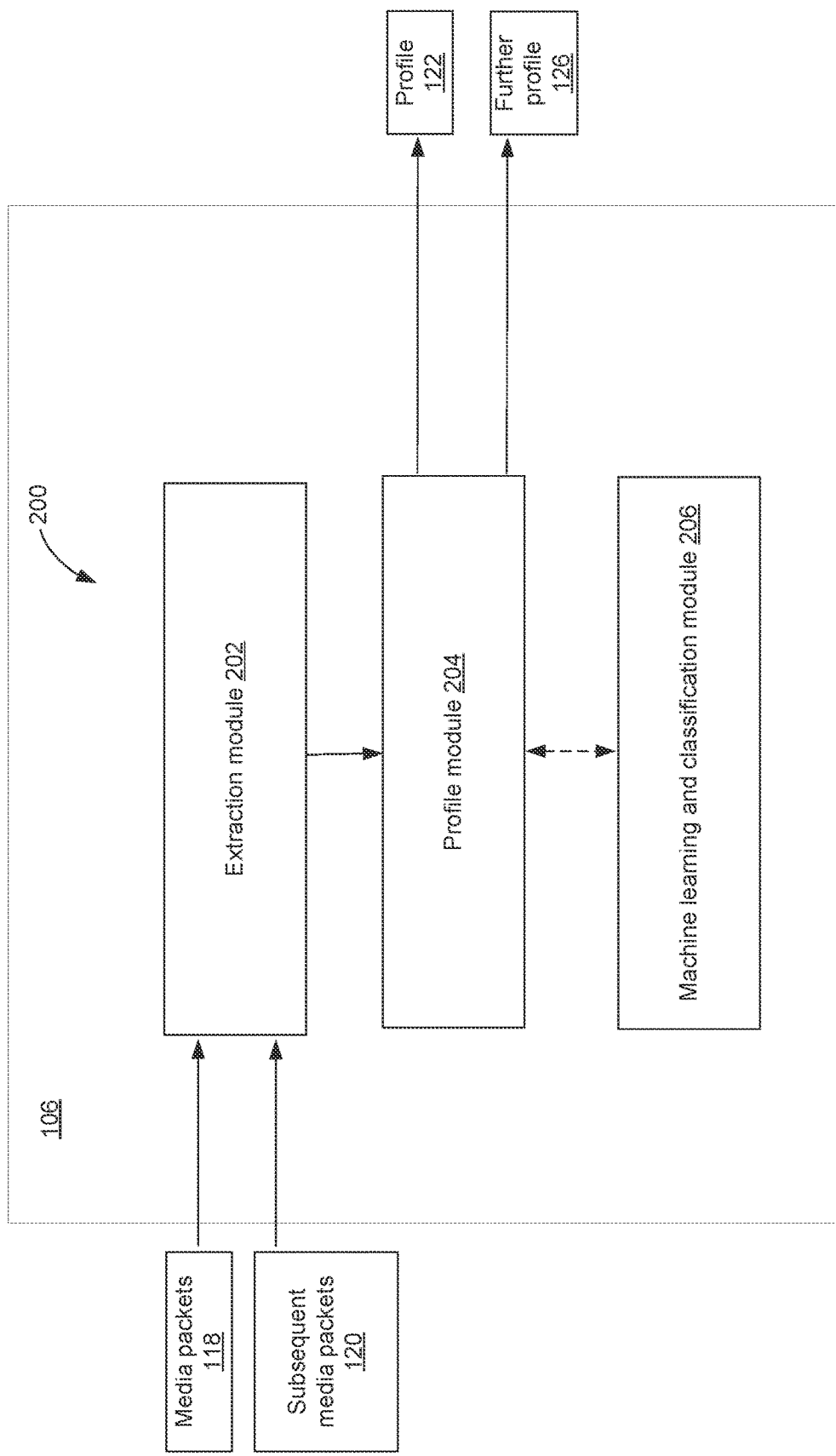
FIG. 2 is an example control flow of a profile generation process for the system in an embodiment of the present disclosure.

FIG. 2 shows an example control flow of a profile generation process 200 for the system 100 in an embodiment of the present disclosure. The profile generation process 200 is shown as being performed by the profile generation module 106. In one embodiment, the profile generation process 200 may be implemented by modules and sub-modules. For example, the profile generation module 106 may include an extraction module 202, a profile module 204, and a machine learning and classification module 206. In one embodiment, the extraction module 202 may couple to the profile module 204. The profile module 204 may further couple to the machine learning and classification module 206.

The extraction module 202 enables the analysis or receipt of the headers, fields, or identifiers of the media packets 118 or subsequent media packets 120 or the packets themselves to determine the characteristics of the media content. The processes used by the extraction module 202 can be similar to those used in the detection module 104 and include extracting the headers, fields, or identifiers of the packets.

In one embodiment, once the extraction module 202 performs its functions, it can pass control, and the extracted characteristics of the media content to the profile module 204. The profile module 204 enables the generation of the profile 122 or the further profile 124 using the same techniques and methods as described with respect to the profile generation module 106. For example, this may be done by generating a table or vector with extracted characteristics of the media content.

In one embodiment, once the profile module 204 performs its functions, it can optionally pass the profile 122 or the further profile 126 to the machine learning and classification module 206. Alternatively, it can output the profile 122 or the further profile 126 generated as the output of the profile generation module 106. The machine learning and classification module 206 can implement and enable the machine learning process discussed with respect to the profile generation module 106. For example, the machine learning and classification module 206 can implement the neural networks, the convolutional neural networks, the recurrent neural networks, the non-recurrent neural networks, or other machine learning processes. The machine learning and classification module 206 can also generate the tags or labels for the profile 122 or the further profile 126.

In one embodiment, once the machine learning and classification module 206 performs its functions, it can pass control, and the profile 122 or the further profile 124 with the tags or labels, back to the profile module 204. The profile module 204 can then output the profile 122 or the further profile 124 as the output of the profile generation module 106.

Figure 3:
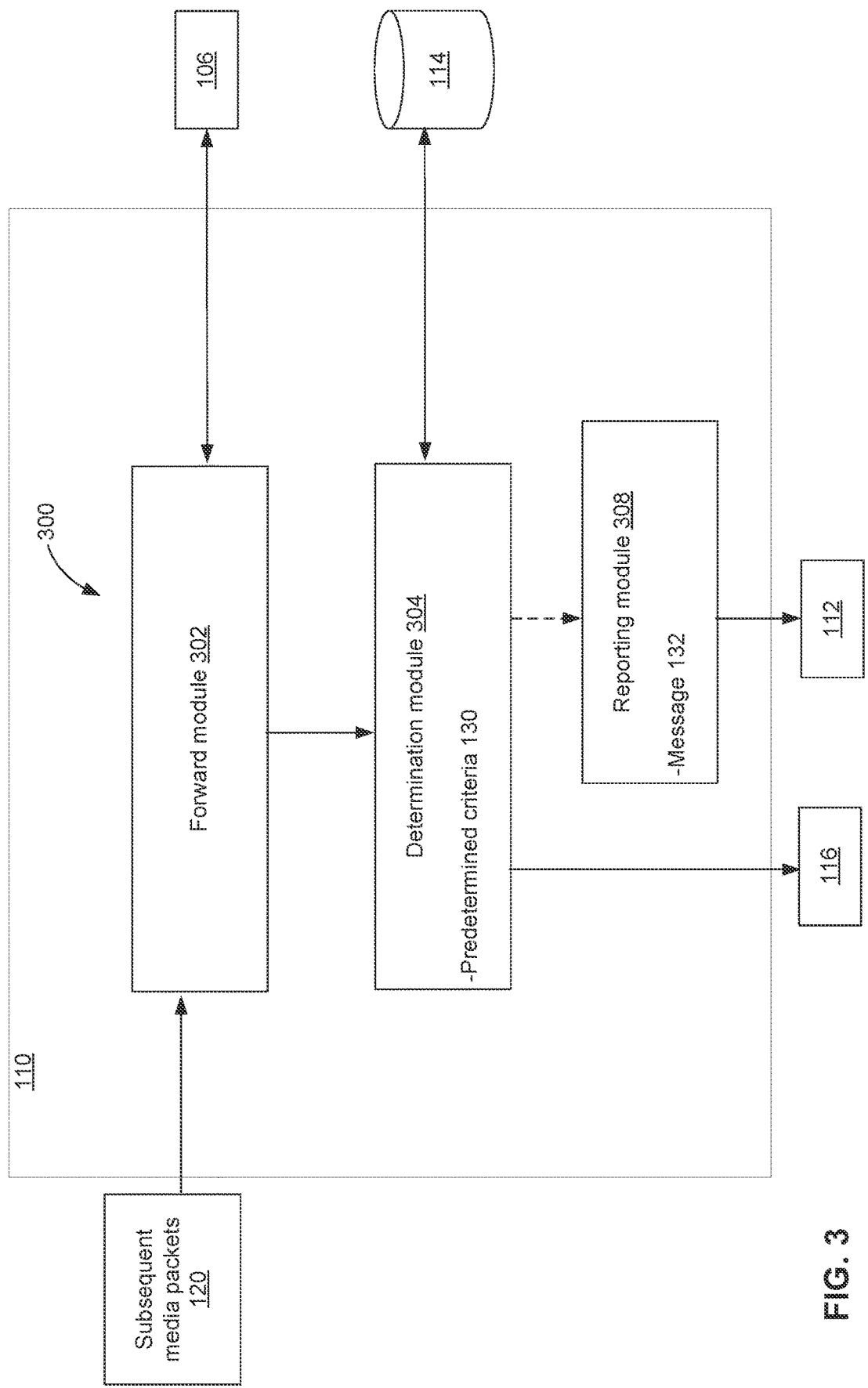
FIG. 3 is an example control flow of a comparison process for determining what media content to transmit in an embodiment of the present disclosure.

FIG. 3 shows an example control flow of a comparison process 300 for determining what media content to transmit in an embodiment of the present disclosure. The comparison process 300 is shown as being performed by the comparison module 110. In one embodiment, the comparison process 300 may be implemented by modules and sub-modules. For example, the comparison module 110 may include a forward module 302, a determination module 304, and a reporting module 308. In one embodiment, the forward module 302 may be coupled to the determination module 304. The determination module 304 may further be coupled to the reporting module 308.

The forward module 302 enables the forwarding or transmitting of the subsequent media packets 120 to the profile generation module 106 to generate the further profile 126, using the same techniques mentioned with respect to the comparison module 110. In one embodiment, once the further profile 126 is generated it can further be sent to the hash generation module 108 (not shown in FIG. 3) so that the further hash value 128 may be generated for the further profile 126. In one embodiment, the further hash value 128 and the further profile 126 may be transmitted back to the forward module 302 so that the comparison process 300 can continue.

In one embodiment, once the forward module 302 performs its functions, it can pass control, the further profile 126, and the further hash value 128 to the determination module 304. The determination module 304 enables the comparison of the further profile 126 to other profiles on the database 114 using the same techniques mentioned previously with respect to the comparison module 110. The determination module 304 can implement the rules, conditional statements, thresholds, the predetermined criteria 130, or a combination thereof to perform the comparison of the further profile 126 to the profiles on the database 114. In one embodiment, based on the outcome of the comparison, the determination module 304 can transmit the media packets 118 or the subsequent media packets 120 to the destination 116.

In one embodiment, once the determination module 304 performs its function, it can optionally pass control to the reporting module 308 to generate the message 132 to send to the originator 112 using the techniques mentioned previously with respect to the comparison module 110. In one embodiment, the reporting module 308 can generate the report, alert, notification, or a combination thereof to the originator 112.

The modules described in FIGS. 1-3 may be implemented as instructions stored on a non-transitory computer readable medium to be executed by one or more computing units such as a processor, a special purpose computer, an integrated circuit, integrated circuit cores, or a combination thereof. The non-transitory computer readable medium may be implemented with any number of memory units, such as a volatile memory, a nonvolatile memory, an internal memory, an external memory, or a combination thereof. The non-transitory computer readable medium may be integrated as a part of the system 100 or installed as a removable portion of the system 100.

It has been discovered that the processes and system 100 described above significantly improves the state of the art from previous systems because it introduces a novel way to capture media content over a network 102 and swap the media content dynamically and without human intervention, based on quality of the media content. This results in the most up to date media content being shared amongst users and devices across the network 102. It has been further discovered that the processes and system 100 described improves user experience and administration of the network 102 because it provides a way to customize how media content is shared amongst users or devices across the network 102 by allowing rules to be put in place that determine what media content is transmitted, to whom it is transmitted, and under what conditions. It has been further discovered that the processes and system 100 described above significantly improves the functioning of the network 102 because it allows for the implementation of customizable rules to manage network 102 traffic by allowing certain types of media content to be shared over the network depending on network 102 bandwidth and media content quality, among other factors. This results in an ability to balance the network traffic while ensuring the best quality media content is shared amongst users and devices.

Methods of Operation

Figure 4:
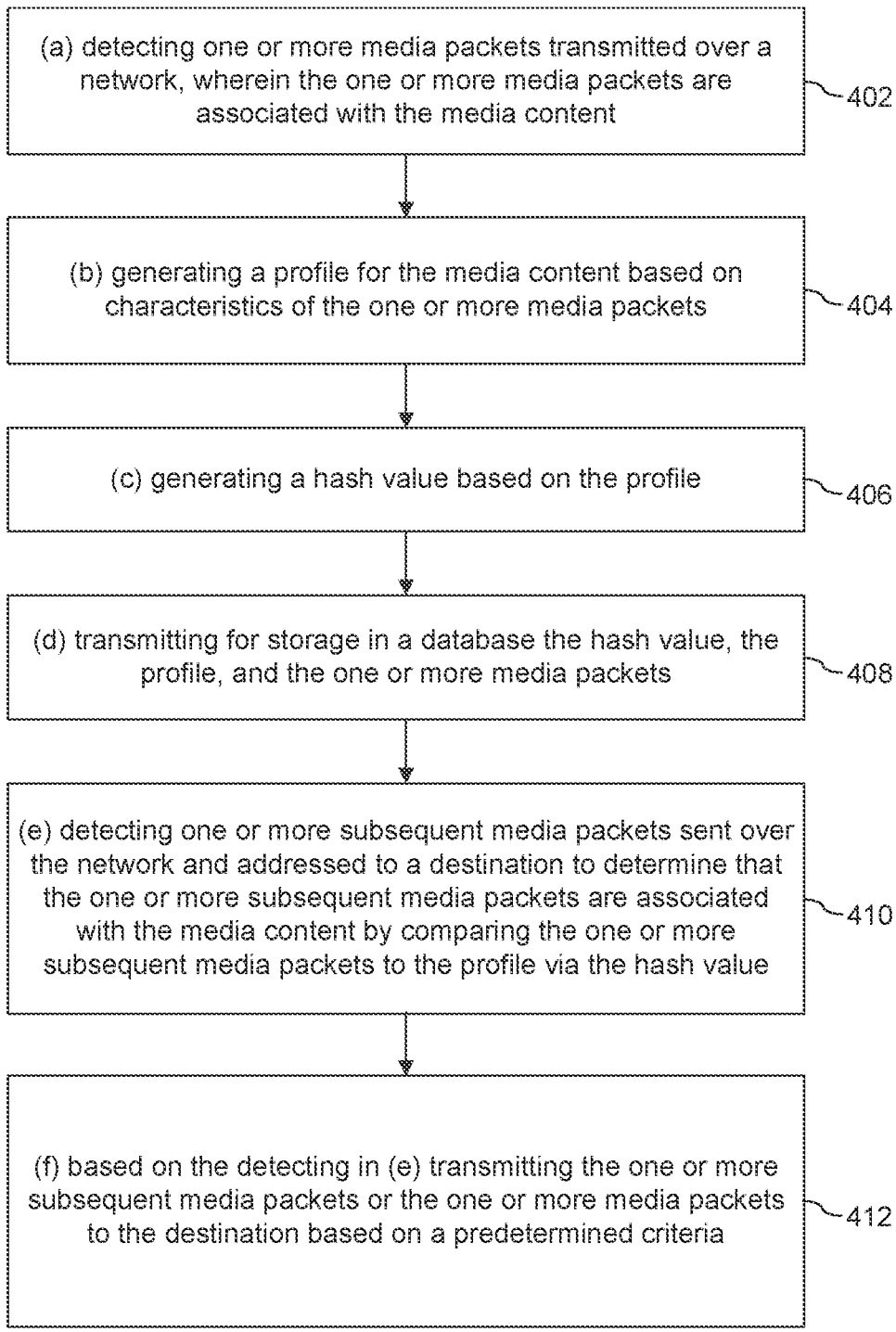
FIG. 4 is an example method of operating the system in an embodiment of the present disclosure.

FIG. 4 shows an example method 400 of operating the system 100 in an embodiment of the present disclosure. The method 400 includes detecting the media packets 118 transmitted over the network 102, wherein the media packets 118 are associated with the media content. The method 400 further includes generating a profile 122 for the media content based on characteristics of the media packets 118. The method 400 further includes generating a hash value 124 based on the profile 122. The method 400 further includes transmitting for storage in the database 114 the hash value 124, the profile 122, and the media packets 118. The method further includes detecting subsequent media packets 120 sent over the network 102 and addressed to a destination 116 to determine that the subsequent media packets 120 are associated with the media content by comparing the subsequent media packets 120 to the profile 122 via the hash value 124. The method 400 further includes, based on the detecting, transmitting the subsequent media packets 120 or the media packets 118 to the destination 116 based on a predetermined criteria 130. The operations of method 400 are performed, for example, by system 100, in accordance with embodiments described above.

Components of the System

Figure 5:
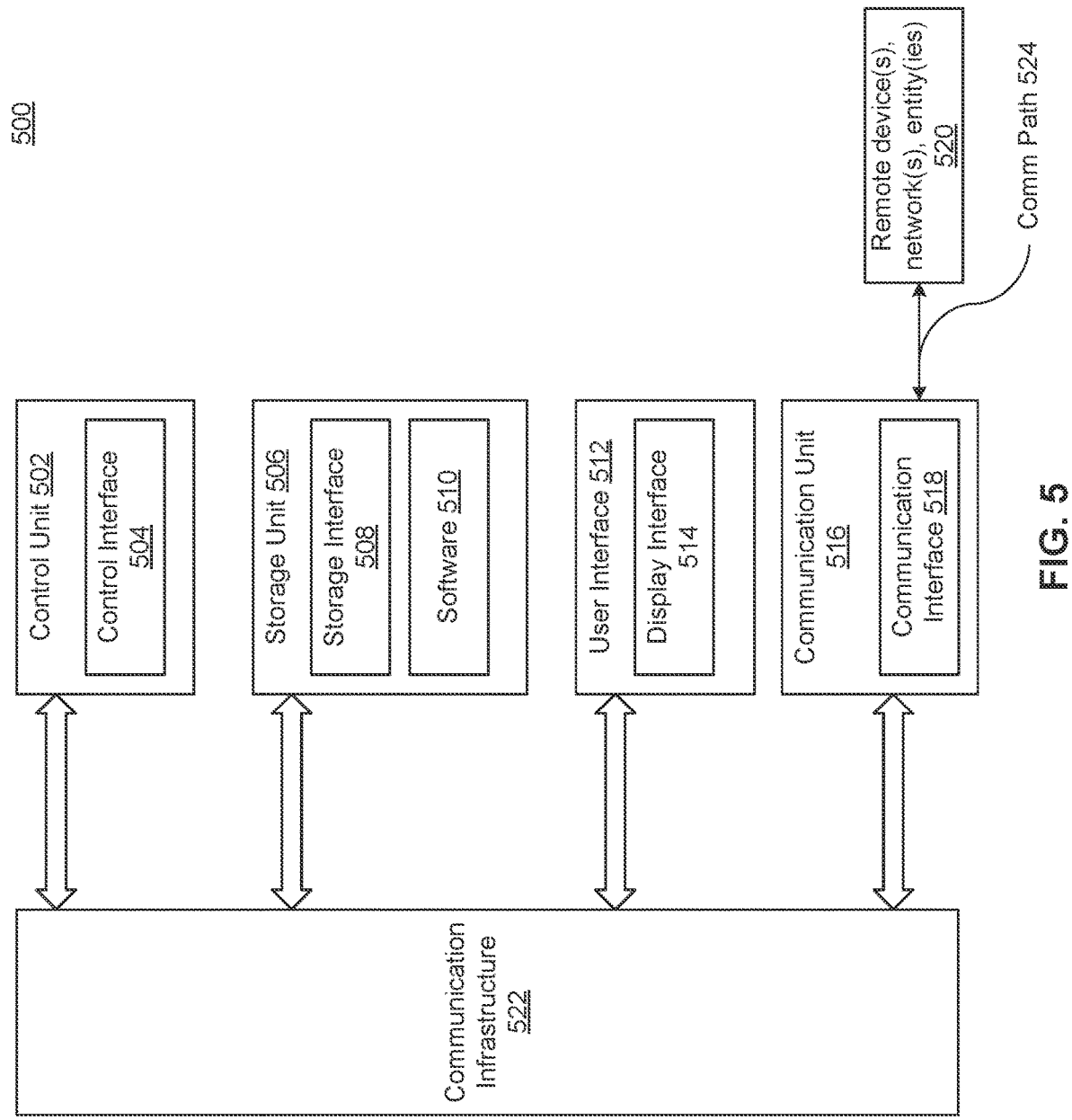
FIG. 5 is an example architecture of the components implementing the system in an embodiment of the present disclosure.

FIG. 5 is an example architecture 500 of the components implementing the system 100 in an embodiment of the present disclosure. In one embodiment, the components may include a control unit 502, a storage unit 506, a communication unit 516, and a user interface 512. The control unit 502 may include a control interface 504. The control unit 502 may execute a software 510 to provide some or all of the intelligence of the system 100. The control unit 502 may be implemented in a number of different ways. For example, the control unit 502 may be a processor, an application specific integrated circuit (ASIC), an embedded processor, a microprocessor, a hardware control logic, a hardware finite state machine (FSM), a digital signal processor (DSP), a field programmable gate array (FPGA), or a combination thereof.

The control interface 504 may be used for communication between the control unit 502 and other functional units or devices of the system 100. The control interface 504 may also be used for communication that is external to the functional units or devices of the system 100. The control interface 504 may receive information from the functional units or devices of the system 100, or from remote devices 520, or may transmit information to the functional units or devices of the system 100 or to remote devices 520. The remote devices 520 refer to units or devices external to the system 100.

The control interface 504 may be implemented in different ways and may include different implementations depending on which functional units or devices of the system 100 or remote devices 520 are being interfaced with the control unit 502. For example, the control interface 504 may be implemented with a pressure sensor, an inertial sensor, a microelectromechanical system (MEMS), optical circuitry, waveguides, wireless circuitry, wireline circuitry to attach to a bus, an application programming interface, or a combination thereof. The control interface 504 may be connected to a communication infrastructure 522, such as a bus, to interface with the functional units or devices of the system 100 or remote devices 520.

The storage unit 506 may store the software 510. For illustrative purposes, the storage unit 506 is shown as a single element, although it is understood that the storage unit 506 may be a distribution of storage elements. Also for illustrative purposes, the storage unit 506 is shown as a single hierarchy storage system, although it is understood that the storage unit 506 may be in a different configuration. For example, the storage unit 506 may be formed with different storage technologies forming a memory hierarchical system including different levels of caching, main memory, rotating media, or off-line storage. The storage unit 506 may be a volatile memory, a nonvolatile memory, an internal memory, an external memory, or a combination thereof. For example, the storage unit 506 may be a nonvolatile storage such as nonvolatile random access memory (NVRAM), Flash memory, disk storage, or a volatile storage such as static random access memory (SRAM) or dynamic random access memory (DRAM). The database 114 may be implemented with the same technologies as the storage unit 506.

The storage unit 506 may include a storage interface 508. The storage interface 508 may be used for communication between the storage unit 506 and other functional units or devices of the system 100. The storage interface 508 may also be used for communication that is external to the system 100. The storage interface 508 may receive information from the other functional units or devices of the system 100 or from remote devices 520, or may transmit information to the other functional units or devices of the system 100 or to remote devices 520. The storage interface 508 may include different implementations depending on which functional units or devices of the system 100 or remote devices 520 are being interfaced with the storage unit 506. The storage interface 508 may be implemented with technologies and techniques similar to the implementation of the control interface 504.

The communication unit 516 may enable communication to devices, components, modules, or units of the system 100 or to remote devices 520. For example, the communication unit 516 may permit the system 100 to communicate with the destination 116, the originator 112, or to transmit data to and from the various modules of the system 100. The communication unit 516 may further permit the devices of the system 100 to communicate with remote devices 520 such as an attachment, a peripheral device, or a combination thereof through a communication path 524, such as a wireless or wired network.

The communication path 524 may span and represent a variety of networks and network topologies. For example, the communication path 524 may be a part of the network 102 and include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in the communication path 524. Cable, Ethernet, digital subscriber line (DSL), fiber optic lines, fiber to the home (FTTH), and plain old telephone service (POTS) are examples of wired communication that may be included in the communication path 524. Further, the communication path 524 may traverse a number of network topologies and distances. For example, the communication path 524 may include direct connection, personal area network (PAN), local area network (LAN), metropolitan area network (MAN), wide area network (WAN), or a combination thereof.

The communication unit 516 may also function as a communication hub allowing the system 100 to function as part of the communication path 524 and not be limited to be an end point or terminal unit to the communication path 524. The communication unit 516 may include active and passive components, such as microelectronics or an antenna, for interaction with the communication path 524.

The communication unit 516 may include a communication interface 518. The communication interface 518 may be used for communication between the communication unit 516 and other functional units or devices of the system 100 or to remote devices 520. The communication interface 518 may receive information from the other functional units or devices of the system 100, or from remote devices 520, or may transmit information to the other functional units or devices of the system 100 or to remote devices 520. The communication interface 518 may include different implementations depending on which functional units or devices are being interfaced with the communication unit 516. The communication interface 518 may be implemented with technologies and techniques similar to the implementation of the control interface 504.

The user interface 512 may present information generated by the system 100. In one embodiment, the user interface 512 allows a user of the system 100 to interface with the devices of the system 100 or remote devices 520. The user interface 512 may include an input device and an output device. Examples of the input device of the user interface 512 may include a keypad, buttons, switches, touchpads, soft-keys, a keyboard, a mouse, or any combination thereof to provide data and communication inputs. Examples of the output device may include a display interface 514. The control unit 502 may operate the user interface 512 to present information generated by the system 100. The control unit 502 may also execute the software 510 to present information generated by the system 100, or to control other functional units of the system 100. The display interface 514 may be any graphical user interface such as a display, a projector, a video screen, or any combination thereof.

The above detailed description and embodiments of the disclosed system 100 are not intended to be exhaustive or to limit the disclosed system 100 to the precise form disclosed above. While specific examples for the system 100 are described above for illustrative purposes, various equivalent modifications are possible within the scope of the disclosed system 100, as those skilled in the relevant art will recognize. For example, while processes and methods are presented in a given order, alternative implementations may perform routines having steps, or employ systems having processes or methods, in a different order, and some processes or methods may be deleted, moved, added, subdivided, combined, or modified to provide alternative or sub-combinations. Each of these processes or methods may be implemented in a variety of different ways. Also, while processes or methods are at times shown as being performed in series, these processes or blocks may instead be performed or implemented in parallel, or may be performed at different times.

The resulting method, process, apparatus, device, product, and system 100 is cost-effective, highly versatile, and accurate, and may be implemented by adapting components for ready, efficient, and economical manufacturing, application, and utilization. Another important aspect of an embodiment of the present disclosure is that it valuably supports and services the historical trend of reducing costs, simplifying systems, and increasing performance.

These and other valuable aspects of the embodiments of the present disclosure consequently further the state of the technology to at least the next level. While the disclosed embodiments have been described as the best mode of implementing the system 100, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computer implemented method for caching and swapping media content, the method comprising:
   generating, by one or more computing devices, a profile for the media content of one or more media packets detected over a network;
   generating, by the one or more computing devices, a hash value based on the profile;
   generating, by the one or more computing devices, a further profile for one or more subsequent media packets detected over the network;
   generating, by the one or more computing devices, a further hash value based on the one or more subsequent media packets;
   determining, by the one or more computing devices, whether the one or more subsequent media packets are the same as the one or more media packets by comparing the further hash value to the hash value to find a match;
   if no match is determined based on the comparing of the further hash value to the hash value, determining, by the one or more computing devices, whether the further profile is within a threshold value of similarity to the profile; and
   based on determining:
      a match between the hash value and the further hash value, or
      that the further profile is within a threshold value of similarity to the profile,
      transmitting, by the one or more computing devices, either one of a one or more subsequent media packets or the one or more media packets to a destination based on a predetermined criteria.

2. The computer implemented method of claim 1, further comprising detecting, by a packet analyzer, the one or more media packets or the one or more subsequent media packets, wherein the packet analyzer intercepts and logs the one or more media packets or the one or more subsequent media packets as they pass through the network.

3. The computer implemented method of claim 1, further comprising detecting the one or more media packets or the one or more subsequent media packets, via the one or more computing devices initiating a crawling function, wherein the crawling function continuously searches for and indexes the one or more media packets or the one or more subsequent media packets transmitted over the network.

4. The computer implemented method of claim 1, further comprising generating, by the one or more computing devices, a tag for the profile or the further profile based on further analyzing the one or more media packets or the one or more subsequent media packets, wherein the tag identifies the one or more media packets or the one or more subsequent media packets with a person, an object, or a topic.

5. The computer implemented method of claim 4, further comprising, classifying, by the one or more computing devices, the profile or the further profile based on the tag.

6. The computer implemented method of claim 1, further comprising determining whether the further profile is within the threshold value of similarity to the profile based on:
   identifying, by the one or more computing devices, characteristics of the profile and the further profile; and comparing, by the one or more computing devices, the characteristics between the profile and the further profile to determine whether they are within the threshold value of similarity.

7. The computer implemented method of claim 1, further comprising determining whether the further profile is within the threshold value of similarity to the profile based on:
mapping, by the one or more computing device and using a clustering algorithm, the profile and the further profile to points in an N-dimensional space;
determining, by the one or more computing devices, a Euclidean distance between a point representing the profile and a point representing the further profile; and
determining, by the one or more computing devices, whether the Euclidean distance is within the threshold value of similarity.

8. A non-transitory computer readable medium including instructions that when executed by a processor perform operations for caching and swapping media content, the operations comprising:
generating, by one or more computing devices, a profile for the media content of one or more media packets detected over a network;
generating, by the one or more computing devices, a hash value based on the profile;
generating, by the one or more computing devices, a further profile for one or more subsequent media packets detected over the network;
generating, by the one or more computing devices, a further hash value based on the one or more subsequent media packets;
determining, by the one or more computing devices, whether the one or more subsequent media packets are the same as the one or more media packets by comparing the further hash value to the hash value to find a match;
if no match is determined based on the comparing of the further hash value to the hash value, determining, by the one or more computing devices, whether the further profile is within a threshold value of similarity to the profile; and
based on determining:
a match between the hash value and the further hash value, or
that the further profile is within a threshold value of similarity to the profile,
transmitting, by the one or more computing devices, either one of the one or more subsequent media packets or the one or more media packets to a destination based on a predetermined criteria.

9. The non-transitory computer readable medium of claim 8, the operations further comprising detecting, by a packet analyzer, the one or more media packets or the one or more subsequent media packets, wherein the packet analyzer intercepts and logs the one or more media packets or the one or more subsequent media packets as they pass through the network.

10. The non-transitory computer readable medium of claim 8, the operations further comprising detecting the one or more media packets or the one or more subsequent media packets, via the one or more computing devices initiating a crawling function, wherein the crawling function continuously searches for and indexes the one or more media packets or the one or more subsequent media packets transmitted over the network.

11. The non-transitory computer readable medium of claim 8, the operations further comprising generating, by the one or more computing devices, a tag for the profile or the further profile based on further analyzing the one or more media packets or the one or more subsequent media packets, wherein the tag identifies the one or more media packets or the one or more subsequent media packets with a person, an object, or a topic.

12. The non-transitory computer readable medium of claim 11, the operations further comprising classifying, by the one or more computing devices, the profile or the further profile based on the tag.

13. The non-transitory computer readable medium of claim 8, the operations further comprising determining whether the further profile is within the threshold value of similarity to the profile based on:
identifying, by the one or more computing devices, characteristics of the profile and the further profile; and
comparing, by the one or more computing devices, the characteristics between the profile and the further profile to determine whether they are within the threshold value of similarity.

14. The non-transitory computer readable medium of claim 8, the operations further comprising determining whether the further profile is within the threshold value of similarity to the profile based on:
mapping, by the one or more computing devices and using a clustering algorithm, the profile and the further profile to points in an N-dimensional space;
determining, by the one or more computing devices, a Euclidean distance between a point representing the profile and a point representing the further profile; and
determining, by the one or more computing devices, whether the Euclidean distance is within the threshold value of similarity.

15. A computing system for caching and swapping media content comprising:
a processor configured to:
generate a profile for the media content of one or more media packets detected over a network;
generate a hash value based on the profile;
generate a further profile for one or more subsequent media packets detected over the network;
generate a further hash value based on the one or more subsequent media packets;
determine whether the one or more subsequent media packets are the same as the one or more media packets by comparing the further hash value to the hash value to find a match;
if no match is determined based on the comparing of the further hash value to the hash value, determine whether the further profile is within a threshold value of similarity to the profile; and
a communication unit including microelectronics, coupled to the processor, configured to:
based on determining:
a match between the hash value and the further hash value, or
that the further profile is within a threshold value of similarity to the profile,
transmit either one of the one or more subsequent media packets or the one or more media packets to a destination based on a predetermined criteria.

16. The computing system of claim 14, wherein the processor is further configured to generate a tag for the profile or the further profile based on further analyzing the one or more media packets or the one or more subsequent media packets, wherein the tag identifies the one or more media packets or the one or more subsequent media packets with a person, an object, or a topic.

17. The computing system of claim 16, wherein the processor is further configured to classify the profile or the further profile based on the tag.

18. The computing system of claim 14, wherein the processor is further configured to determine whether the further profile is within the threshold value of similarity to the profile based on:
    identifying characteristics of the profile and the further profile; and
    comparing the characteristics between the profile and the further profile to determine whether they are within the threshold value of similarity.

19. The computing system of claim 14, wherein the processor is further configured to determine whether the further profile is within the threshold value of similarity to the profile based on:
    mapping, using a clustering algorithm, the profile and the further profile to points in an N-dimensional space;
    determining a Euclidean distance between a point representing the profile and a point representing the further profile; and
    determining whether the Euclidean distance is within the threshold value of similarity.

20. The computing system of claim 14, wherein the processor is further configured to initiate a crawling function to detect the one or more media packets or the one or more subsequent media packets, wherein the crawling function continuously searches for and indexes the one or more media packets or the one or more subsequent media packets transmitted over the network.

* * * * *